(12) United States Patent
Delia et al.

(10) Patent No.: US 8,818,829 B2
(45) Date of Patent: Aug. 26, 2014

(54) METHOD AND SYSTEM FOR REPORTING AND RELATING FIREARM DISCHARGE DATA TO A CRIME REPORTING DATABASE

(75) Inventors: Wayne M. Delia, Poughkeepsie, NY (US); Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1406 days.

(21) Appl. No.: 11/830,107

(22) Filed: Jul. 30, 2007

(65) Prior Publication Data

US 2009/0037374 A1 Feb. 5, 2009

(51) Int. Cl.
*G06Q 10/00* (2012.01)
*F41C 27/00* (2006.01)

(52) U.S. Cl.
USPC .......................................... 705/7.11; 42/106

(58) Field of Classification Search
None
See application file for complete search history.

(56) References Cited

U.S. PATENT DOCUMENTS

| | | | | |
|---|---|---|---|---|
| 2,306,747 A * | 12/1942 | Ojalvo | | 42/1.03 |
| 3,636,323 A * | 1/1972 | Salisbury et al. | | 701/500 |
| 3,936,822 A | 2/1976 | Hirschberg | | |
| 4,603,635 A * | 8/1986 | Boudreau | | 102/206 |
| 5,026,158 A * | 6/1991 | Golubic | | 356/252 |
| 5,303,495 A * | 4/1994 | Harthcock | | 42/84 |
| 5,406,730 A * | 4/1995 | Sayre | | 42/1.02 |
| 5,479,149 A | 12/1995 | Pike | | |
| 5,566,486 A * | 10/1996 | Brinkley | | 42/1.02 |
| 5,577,733 A * | 11/1996 | Downing | | 273/348 |
| 5,636,464 A | 6/1997 | Ciluffo | | |
| 5,747,719 A | 5/1998 | Bottesch | | |
| 5,799,432 A * | 9/1998 | Wright et al. | | 42/1.02 |
| 5,917,775 A * | 6/1999 | Salisbury | | 367/93 |
| 5,937,557 A * | 8/1999 | Bowker et al. | | 42/70.01 |
| 6,067,851 A | 5/2000 | Chaves et al. | | |
| 6,223,461 B1 * | 5/2001 | Mardirossian | | 42/70.11 |
| 6,226,913 B1 | 5/2001 | Haimovich et al. | | |
| 6,386,028 B2 * | 5/2002 | Kolbe | | 73/167 |
| 6,415,542 B1 * | 7/2002 | Bates et al. | | 42/70.11 |
| 6,463,689 B1 * | 10/2002 | McElroy | | 42/70.08 |
| 6,568,116 B2 | 5/2003 | Hathaway | | |
| 6,643,968 B2 | 11/2003 | Glock | | |
| 6,779,716 B1 | 8/2004 | Grow | | |

(Continued)

FOREIGN PATENT DOCUMENTS

| | | |
|---|---|---|
| EP | 1580516 A1 | 9/2005 |
| EP | 2026030 A1 | 2/2009 |

(Continued)

OTHER PUBLICATIONS

Butterfield, "U.S. To Develop a System for 'Fingerprinting' Guns", New York Times, Monday, Dec. 20, 1999, Col. 5, p. 18, Sec. A, pp. 1-2.

(Continued)

*Primary Examiner* — Matthew T Sittner
(74) *Attorney, Agent, or Firm* — Cantor Colburn LLP

(57) ABSTRACT

A method for utilizing firearm discharge data in a crime reporting and tracking database, includes: recording one or more discharges of a firearm; transmitting information from the discharging firearm to a crime reporting and tracking database; utilizing the transmitted information to establish relationships between the discharged firearm, committed crimes, and missing persons within the crime reporting and tracking database; and wherein the recording and transmitting is carried out by devices within the firearm.

13 Claims, 4 Drawing Sheets

(56) References Cited

U.S. PATENT DOCUMENTS

| | | | |
|---|---|---|---|
| 6,823,621 | B2 | 11/2004 | Gotfried |
| 6,965,312 | B2 | 11/2005 | Lerg |
| 7,100,437 | B2 | 9/2006 | Johnson et al. |
| 7,168,198 | B2 | 1/2007 | Newkirk et al. |
| 7,278,417 | B2 * | 10/2007 | Ciesiun .......................... 124/82 |
| 7,441,362 | B1 * | 10/2008 | Kley ........................... 42/70.01 |
| 7,509,766 | B2 * | 3/2009 | Vasquez ......................... 42/1.01 |
| 7,810,273 | B2 * | 10/2010 | Koch et al. ...................... 42/111 |
| 2001/0015090 | A1 * | 8/2001 | Kolbe ........................... 73/35.01 |
| 2001/0029011 | A1 * | 10/2001 | Dagani et al. .................... 434/11 |
| 2002/0198659 | A1 * | 12/2002 | Doyle et al. .................. 701/300 |
| 2003/0097776 | A1 * | 5/2003 | Brosow ........................ 42/70.01 |
| 2003/0133598 | A1 * | 7/2003 | Recce ........................... 382/115 |
| 2003/0180038 | A1 * | 9/2003 | Gordon ......................... 396/263 |
| 2003/0214405 | A1 * | 11/2003 | Lerg et al. ..................... 340/565 |
| 2004/0031180 | A1 * | 2/2004 | Ivanov ......................... 42/70.11 |
| 2004/0031474 | A1 * | 2/2004 | Ciesiun ........................... 124/80 |
| 2004/0200109 | A1 * | 10/2004 | Vasquez ......................... 42/1.01 |
| 2004/0225681 | A1 * | 11/2004 | Chaney et al. ............. 707/104.1 |
| 2005/0024807 | A1 * | 2/2005 | Cerovic et al. ................ 361/232 |
| 2005/0114084 | A1 * | 5/2005 | Johnson et al. ............... 702/183 |
| 2005/0225443 | A1 * | 10/2005 | Lerg ......................... 340/539.13 |
| 2005/0262751 | A1 * | 12/2005 | Leslie .......................... 42/70.01 |
| 2006/0005447 | A1 * | 1/2006 | Lenner et al. .................... 42/111 |
| 2006/0009240 | A1 * | 1/2006 | Katz ........................... 455/457 |
| 2006/0112943 | A1 * | 6/2006 | Ciesiun ........................... 124/47 |
| 2006/0184575 | A1 * | 8/2006 | Singleton .................. 707/104.1 |
| 2008/0017452 | A1 * | 1/2008 | Chen ......................... 184/105.2 |
| 2008/0062248 | A1 * | 3/2008 | Sahashi ...................... 348/14.01 |
| 2008/0065634 | A1 | 3/2008 | Krinsky |
| 2008/0066362 | A1 * | 3/2008 | Fidlow ............................. 42/90 |
| 2008/0163536 | A1 * | 7/2008 | Koch et al. ...................... 42/111 |
| 2008/0267013 | A1 * | 10/2008 | Fisher et al. .................. 367/127 |
| 2008/0282595 | A1 * | 11/2008 | Clark et al. .................... 42/1.01 |
| 2009/0016496 | A1 * | 1/2009 | Bulmer ........................... 379/45 |
| 2009/0037374 | A1 | 2/2009 | Delia et al. |
| 2009/0071055 | A1 * | 3/2009 | Kley ............................. 42/114 |
| 2009/0084015 | A1 * | 4/2009 | Compton et al. ............. 42/1.02 |
| 2010/0198858 | A1 * | 8/2010 | Edwards et al. ............. 707/769 |
| 2010/0199745 | A1 * | 8/2010 | Mooty et al. ................. 73/12.11 |
| 2010/0206282 | A1 * | 8/2010 | Italia et al. .................. 124/51.1 |
| 2010/0281725 | A1 * | 11/2010 | Arbouw ........................ 42/1.02 |
| 2012/0123996 | A1 | 5/2012 | Krinsky |
| 2012/0182837 | A1 * | 7/2012 | Calhoun et al. ............... 367/127 |
| 2012/0275273 | A1 * | 11/2012 | Showen ........................ 367/127 |

FOREIGN PATENT DOCUMENTS

| | | | | | |
|---|---|---|---|---|---|
| JP | 01023420 | A | * | 1/1989 | ............... G11B 5/84 |
| JP | 2002358633 | A | * | 12/2002 | ............... G11B 5/85 |
| JP | 2003225877 | A | * | 8/2003 | ............... B25J 13/00 |
| WO | 8802841 | A1 | | 4/1988 | |
| WO | 03087868 | A2 | | 10/2003 | |
| WO | 2004042495 | A2 | | 5/2004 | |
| WO | 2004044515 | A2 | | 5/2004 | |
| WO | 2005024337 | A2 | | 3/2005 | |
| WO | 2006099902 | A1 | | 9/2006 | |
| WO | 2008048116 | A1 | | 4/2008 | |

OTHER PUBLICATIONS

Glendening, "Tracing Bullets", New York Times, Sunday, Oct. 20, 2002, Col. 5, p. 10, Sec. 4, 1 page.

Li et al., "An Image Databse for Firearms Identification Based on Images of Cartridge Case and Projectile", Proceedings of the Fourth IASTED International Conference, Signal and Image Processing, Aug. 12-14, 2002, ACTA Press, pp. 615-620.

Li et al., "Online Multimedia System for Ballistics Firearms Identification Based on Images of Cartridge Case and Projectile", Proceedings of the Sixth IASTED International Conference, Internet and Multimedia Systems and Applications, Aug. 12-14, 2004, ACTA Press, pp. 242-247.

"Brady President Urges Changes in Gun Laws Post-Virginia Tech", PR Newswire, May 1, 2007, pp. 1-2.

Non-Final Office Action for related U.S. Appl. No. 14/152,254, dated Feb. 7, 2014, pp. 1-41.

O'Connell, "The Next Big Thing: Using Gun Prints to Solve Cases", Wall Street Journal, Thursday, Feb. 10, 2000, Col. 1, p. 1, Sec. A, pp. 1-5.

Rowe, "Producing with Ada—Real-Time Solutions for Complex Problems", Defense Electronics, Jul. 1990, pp. 41-51.

Smith et al., "Optical Imaging Techniques for Ballistics Specimens to Identify Firearms", IEEE, 1995, pp. 275-289.

Smith, "Fireball: a Forensic Bailistics Imaging System", IEEE, 1997, pp. 64-70.

Thompson et al., "Automated firearms evidence comparison using the Integrated Ballistic Identification System (IBIS)", SPIE Conference on Investigation and Forensic Science Technologies, SPIE vol. 3576, Nov. 1998, pp. 94-103.

* cited by examiner

METHOD AND SYSTEM FOR REPORTING AND RELATING FIREARM DISCHARGE DATA TO A CRIME REPORTING DATABASE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to firearms, and more particularly to a method and system for relating firearm discharge data to crime reporting databases.

2. Description of the Related Art

Crime prevention and solving committed crimes, unfortunately, is a never-ending job of law enforcement. Efforts at weapons registration and forms of gun control have not stemmed the levels of crime in society. Proposed inventions related to control and monitoring of firearm usage have included: firearms equipped with electronic devices for determining and recording owner gun registration, weapon identification, biometric controls, recognition of gun removal from a holster, when and how many shots were fired from a weapon, radio frequency (RF) transmission of weapon data, and tracking weapons with global positioning system (GPS) satellites.

SUMMARY OF THE INVENTION

Embodiments of the present invention include a method and system for utilizing firearm discharge data in a crime reporting and tracking database, the method includes: recording one or more discharges of a firearm; transmitting information from the discharging firearm to a crime reporting and tracking database; utilizing the transmitted information to establish relationships between the discharged firearm, committed crimes, and missing persons within the crime reporting and tracking database; and wherein the recording and transmitting is carried out by devices within the firearm.

A method for a crime, missing person and firearm search service, the method includes: receiving an access request to a crime, missing person and firearm search service in a database; analyzing the access request to determine if the requested search service is for a crime or a missing person; wherein if the access request is for a crime, the access request comprises a requester name, a requester identification (ID), and specifies a date range, a time range, a location of a crime, a relative proximity to the location of the crime to check for firearm discharges, and the types and caliber of firearm to search for; wherein if the access request involves a missing person, the access request comprises a requestor name, the missing persons name, the locations where the missing person resided, the locations, dates, and time ranges the missing person were last seen, a relative proximity to the location of the missing person to check for firearm discharges, and the types and caliber of firearm to search for; identifying firearms discharged during the specified date and time range and within the specified location proximity; outputting firearm discharges that occur within the specified date range, time range, and location proximity to a crime or missing person A system for utilizing firearm discharge data in a crime reporting and tracking database, the system includes: one or more firearms; a computer server; one or more networks; one or more input and output devices; wherein the one or more firearms are configured with recording and transmitting devices; wherein the transmitting devices forward information from the one or more firearms in response to a discharge from at least one of the firearms to a crime reporting and tracking database on the computer server via the one or more networks; wherein the transmitted information is utilized to establish relationships between the discharged firearm, committed crimes, and missing persons within the crime reporting and tracking database; wherein the transmitted information comprises identification of the firearm (firearm ID), date, time, location and number of the discharges; wherein the crime reporting and tracking database comprises type of crime committed, location of the criminal incident, date and time ranges of the criminal incident, and victim and suspect profile information; wherein the victim and suspect information comprises personnel information, known residences and whereabouts of suspects at the approximate time of the crime; wherein in the case of a missing person, the locations where the missing person was last seen, and the dates and time ranges when the person was thought to be missing are also included in the database; wherein the one or more input and output devices are connected to the computer server via the one or more networks; wherein a GUI configured for the one or more input and output devices facilitates the entry of information and queries to the crime reporting and tracking database; and wherein the GUI is configured for displaying information outputted from the crime reporting and tracking database on the one or more input and output devices Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for a method and system for utilizing firearm usage and location data in crime reporting databases, to assist law enforcement and government agencies in solving and preventing criminal incidents.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Embodiments of the invention provide a method and system for utilizing firearm usage and location data in crime reporting and tracking databases, to assist law enforcement and government agencies in solving and preventing criminal incidents.

In an embodiment of the invention, a recording device within a firearm records when and how many times the weapon has been discharged. The discharge of the firearm also initiates the wireless transmission of information related to the firearm to a crime reporting and tracking database. The information that is transmitted includes identification of the firearm (firearm ID), date, time, location and number of the discharges. Location information may be obtained via global positioning system (GPS) satellites and related electronic device chip sets, or via terrestrial infrastructure such as the cellular phone system, or Internet gateways. Methods such as triangulating an RF transmission between cell sites have proven effective in locating a transmitting device. In a wireless local area network (WLAN), the Internet gateway and the associated Internet protocol (IP) address may be used to locate the discharging firearm. The monitoring and reporting electronics may be integrated into the weapon, so as to disable the weapon if they are tampered with.

The crime reporting and tracking database includes all crimes that are currently unsolved. Crime statistics tracked by the database include type of crime committed, location of the criminal incident, date and time ranges of the criminal incident. Additional information related to the criminal incident and stored within the database includes victim and suspect profile information. The victim and suspect information includes personnel information, and known residences and whereabouts of suspects at the approximate time of the crime. In the case of an abduction or missing person, the locations where the person was last seen, and the dates and time ranges when the person was thought to be missing are also included in the database. Evidence gathered in the course of an investigation may be added to the database.

Figure 1A:
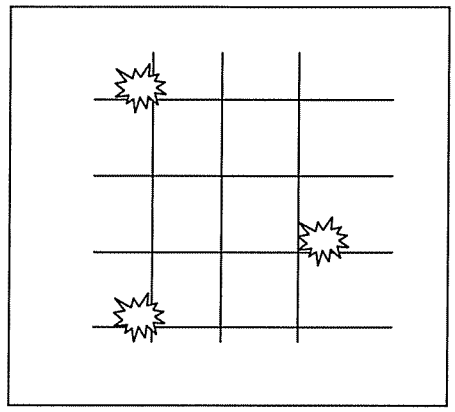
FIG. 1A-1C illustrates overlay maps relating discharging fire arms to city streets according to embodiments of the invention.
Figure 1B:
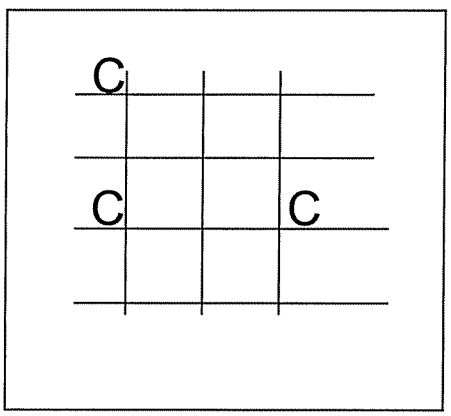
Figure 1C:
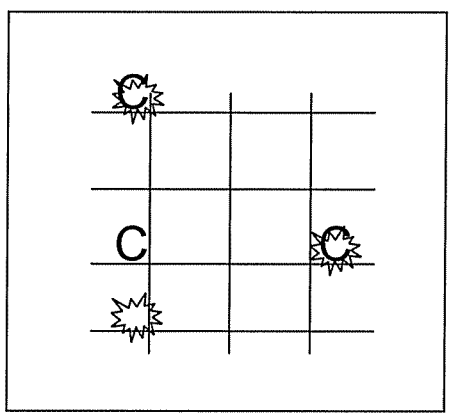

In embodiments of the invention graphical user interfaces (GUI) facilitate user defined and configured searches of the crime reporting and tracking database, and provides maps and geographic overlays of the reported crimes and the firearm discharge data. FIGS. 1A-1C illustrate an overlay of firearm discharge data (FIG. 1A), city crime data (FIG. 1B), in a combined overlaid figure (FIG. 1C). In FIGS. 1A-1C the lines represent city streets, the burst pattern represents one or more firearm discharges, and the letters C represent reported crimes. In a further example, users may request a search of firearm discharges between a given date range, and within a given radius to a crime. The user may further restrict the search by specifying the type (automatic, semiautomatic, handgun, shotgun, rifle) and caliber of weapon used. The GUI may also provide analysis tools for reviewing data within the crime reporting and tracking database such as establishing possible relationships between the owner of the firearm and the victim.

In embodiments of the invention, the crime reporting and tracking database may be on a central server that is made available to law enforcement and government agencies nationwide that subscribe to the crime reporting and tracking database as a service. Alternatively, the crime reporting and tracking database may be implemented on a local or regional basis. Subscription billing charges may be based on the amount of database system usage, or on a flat fee per unit of time. Billing software for tracking usage charges, subscription fees, and user notifications may be integrated within embodiments of the invention. Access to the crime reporting and tracking database can be controlled with user IDs and passwords.

Figure 2:
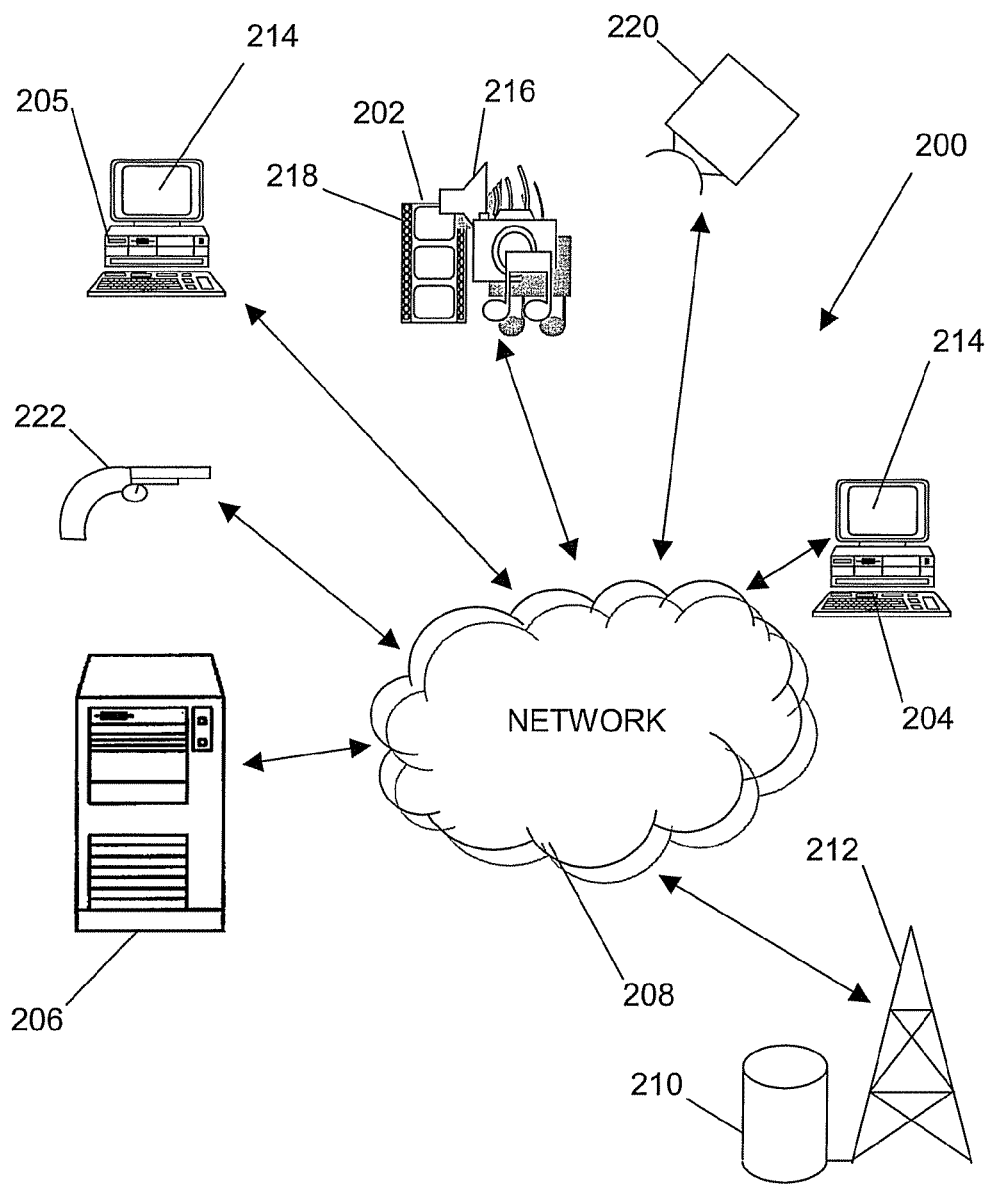
FIG. 2 illustrates a system for implementing embodiments of the invention.

FIG. 2 is a block diagram of an exemplary system 200 for implementing embodiments of the invention that utilize firearm usage and location data in crime reporting and tracking databases, to assist law enforcement and government agencies in solving and preventing criminal incidents. The system 200 includes remote devices including one or more multimedia/communication devices 202 equipped with speakers 216 for implementing the audio, as well as display capabilities 218 for facilitating graphical user interface (GUI) aspects for conducting data entry requests, searches and statistical analysis of the data within the crime reporting and tracking database that is stored in server system 206. In addition, mobile computing devices 204 and desktop computing devices 205 equipped with displays 214 for use with the GUI of the present invention are also illustrated. The remote devices 202 and 204 may be wirelessly connected to a network 208.

The network 208 may be any type of known network including a local area network (LAN), wide area network (WAN), wireless local area network (WLAN), global network (e.g., Internet), intranet, etc. with data/Internet capabilities as represented by server 206. Communication aspects of the network are represented by cellular base station 210 and antenna 212. Location information for the discharging firearm 222 may be provided by GPS information from a series of satellites 220, from signal measurements of RF communications with the cellular network 212 or via the nearest Internet protocol (IP) receiving station in a WLAN or WAN network 208. The discharging firearm 222 is equipped with memory, monitoring, communication, and location related chip sets.

Each remote device 202 and 204 may be implemented using a general-purpose computer executing a computer program for carrying out the GUI described herein. The computer program may be resident on a storage medium local to the remote devices 202 and 204, or maybe stored on the server system 206 or cellular base station 210. The server system 206 may belong to a public service. The remote devices 202 and 204, and desktop device 205 may be coupled to the server system 206 through multiple networks (e.g., intranet and Internet) so that not all remote devices 202, 204, and desktop device 205 are coupled to the server system 206 via the same network. The remote devices 202, 204, desktop device 205, and the server system 206 may be connected to the network 208 in a wireless fashion, and network 208 may be a wireless network. In a preferred embodiment, the network 208 is a LAN and each remote device 202, 204 and desktop device 205 executes a user interface application (e.g., web browser) to contact the server system 206 through the network 208. Alternatively, the remote devices 202 and 204 may be implemented using a device programmed primarily for accessing network 208 such as a remote client.

An example of the system 200 in operation is as follows. A firearm 222 is discharged. In response to being discharged, the firearm 222 transmits its stored registration information, the number of times it has been discharged, and its location information via the network 208. The location information can be obtained from the network 208, or from the GPS satellites 220. The information is transferred over the network 208 to the server 206 that holds the crime reporting and tracking database. Users may query the crime reporting and tracking database via remote devices 202, 204 and desktop device 205 utilizing a GUI.

Figure 3:
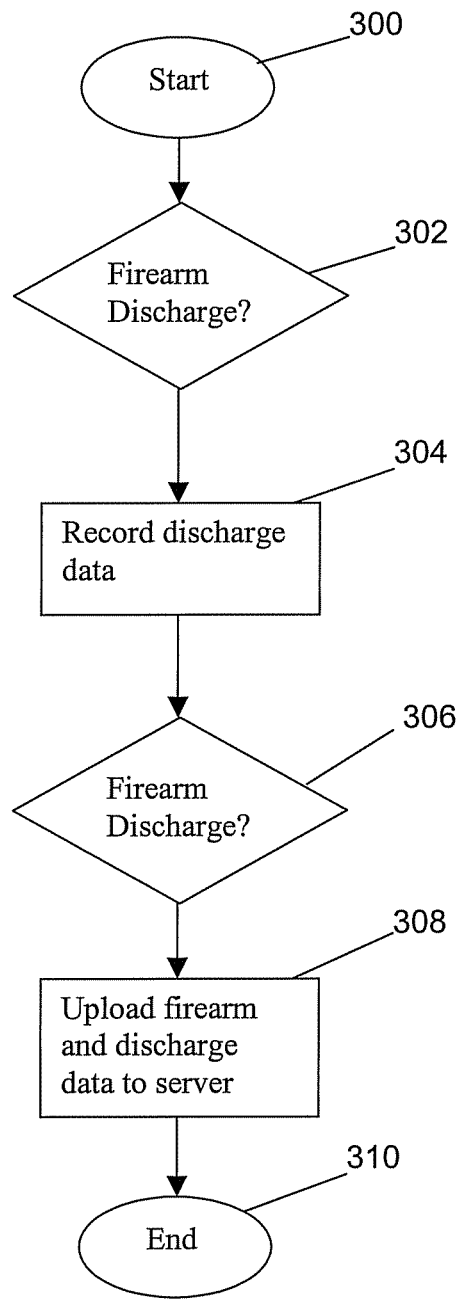
FIG. 3 is a flow diagram illustrating a process of recording and reporting firearm discharge data according to embodiments of the invention.
Figure 4:
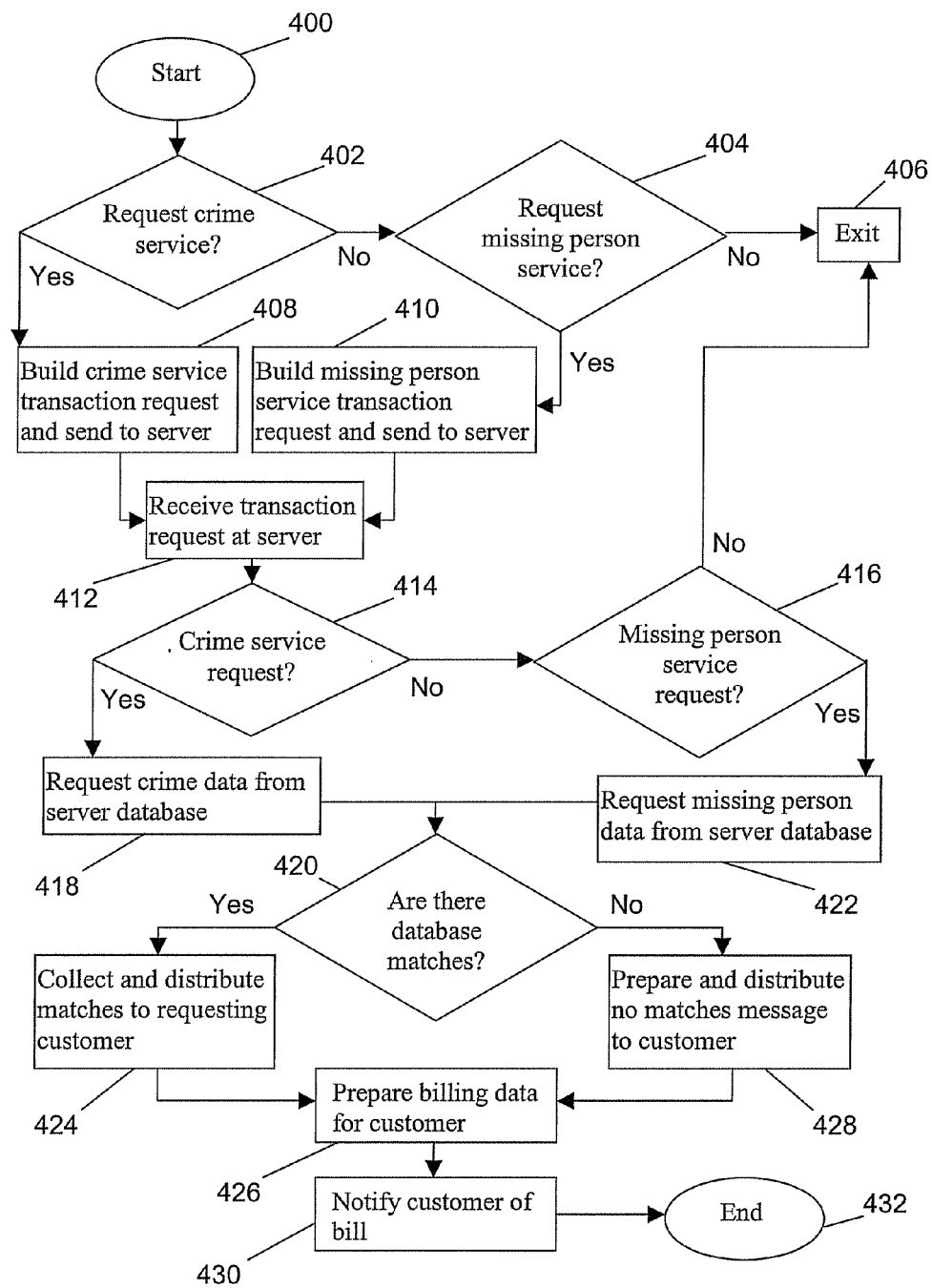
FIG. 4 is a flow diagram illustrating customer service requests to a crime reporting and tracking database according to embodiments of the invention.

FIG. 3 is a flow diagram illustrating a process of recording and reporting firearm discharge data according to embodiments of the invention. The process starts (block 300) when a firearm is discharged (block 302) and the discharge event is recorded in a memory device within the firearm (block 304). The monitoring device within the firearm continues to monitor for additional discharges from the firearm (block 306), and begins to upload identification, location, and discharge information to the server with the crime reporting and tracking database (block 308). The process ends (block 310) after a predefined period with no additional firearm discharges FIG. 4 is a flow diagram illustrating customer service requests to a crime reporting and tracking database according to embodiments of the invention. The process starts (block 400) with a user either requesting a crime service report (block 402) or a missing person service report (block 404) from a crime reporting and tracking database that is stored on a server. Depending on the service requested different inputs are required from the user. For a crime service request (block 402 is Yes), the user builds a crime service transaction request (block 408) that is sent to the server. The transaction request includes the requestor's name, a date, location, and time range of a crime of interest, and proximity to a crime to check for a firearm discharge. The user can also request specific information on potential firearms found, or searched for including type (automatic, semiautomatic, handgun, shotgun, rifle) and caliber of weapon used.

For a missing person service request (block 404 is Yes), the user builds a missing person service transaction request (block 410) that is sent to the server. The transaction request includes the requestors name, the missing persons name, the locations where the missing person resided, the locations where the missing person were last seen, and the dates and time ranges when the missing person was thought to have become missing. A proximity check for firearm discharges in relation to the missing person data can also be requested. The user can also request specific information on potential firearms found, or searched for including type (automatic, semiautomatic, handgun, shotgun, rifle) and caliber of weapon used. If the user inputs a non valid request the process is exited (block 406)

The transaction request is received at the server (block 414), and the server determines whether a crime service request (block 414 is Yes), or a missing person request (block 416 is Yes). For a crime service request (block 418), if a match to a transaction service request is found in the database (block 420 is Yes), the data extracted from the crime reporting and tracking database may include firearm discharges that were within the date range, time range, and proximity of the crime of interest. Additional information on a weapon of interest includes ID of owner, and type and caliber of weapon. The data extracted is collected and distributed to the requesting user (block 424). For a missing person request (block 416 is Yes), missing person data (block 422) is requested from the database. If a match is found in the database (block 420 is Yes) for a firearm discharge within the requested parameters, the following information for the missing person is prepared and distributed (block 424) including the missing persons name, the locations where the missing person resided, the locations where they were last seen, and the dates and time ranges when the person was thought to have gone missing. If for either a crime service request (block 414) or a missing person service request (block 416) no matches are found in the database (block 420 is No), a no match found message is prepared and sent to the user (block 428). Billing data is prepared for the user (block 426) and the user is notified of their bill (block 430), and the session is ended (block 432).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a considering order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for utilizing firearm discharge data in a crime reporting and tracking database, the method comprising:
   recording data related to one or more discharges of a firearm, wherein the data is recorded in a memory device within the firearm and the data includes a time, a date and a number of the one or more discharges of the firearm;
   initiating transmission of information wirelessly from the discharging firearm in real-time to a crime reporting and tracking database in response to the one or more discharges, thereby updating the crime reporting and tracking database in response to the one or more discharges, wherein the information comprises the data related to the one or more discharges of the firearm, a time of the one or more discharges, and a location of the firearm at the time of the one or more discharges; and
   utilizing the transmitted information to establish relationships between the discharged firearm, committed crimes at the location, and missing persons associated with the location within the crime reporting and tracking database and to update a current whereabouts of a crime suspect at the time of the discharge in real-time, the utilizing comprising:
      receiving a request from a requestor, the request comprising an incident date, an incident time, and a location of interest;
      comparing the incident date, the incident time, and the location of interest to the recorded data;
      collecting the recorded data responsive to determining that the incident date, the incident time and location of interest match the date, the time, and the location of the one or more discharges; and
      transmitting the collected data to the requester, the collected data including the current whereabouts of the crime suspect;
   wherein the recording and transmitting is carried out by devices within the firearm.

2. The method of claim 1, wherein the transmitted information further comprises an identification of the firearm (firearm ID), and a location of the discharges.

3. The method of claim 2, wherein the discharging firearm location is determined with global positioning system (GPS) satellites.

4. The method of claim 2, wherein the discharging firearm location is determined from signal measurements of RF communications to the cellular infrastructure equipment.

5. The method of claim 2, wherein the discharging firearm location is determined with Internet gateways and their associated Internet protocol (IP) addresses in a wireless local area network (WLAN).

6. The method of claim 2, wherein the discharging firearm location is utilized to construct geographic overlays of the firearm discharges with the committed crimes and missing persons within the crime reporting and tracking database.

7. The method of claim 1, wherein tampering with the recording and transmitting devices disables the firearm.

8. The method of claim 1, wherein the crime reporting and tracking database comprises type of crime committed, location of the criminal incident, date and time ranges of the criminal incident, and victim and suspect profile information;
   wherein the victim and suspect information comprises personnel information, known residences and whereabouts of suspects at the approximate time of the crime; and
   wherein in the case of a missing person, the locations where the missing person was last seen, and the dates and time ranges when the person was thought to be missing are also included in the database.

9. The method of claim 1, wherein usage of the crime reporting and tracking database is subscription fee based; and
   wherein the subscription fees are based on the amount of usage of the crime reporting and tracking database.

10. The method of claim 1, wherein usage of the crime reporting and tracking database is subscription fee based; and
    wherein the subscription fees are based on a flat fee per unit of time.

11. A system for utilizing firearm discharge data in a crime reporting and tracking database, the system comprising:
    one or more firearms;
    a computer server;
    one or more networks;
    one or more input and output devices;
    wherein the one or more firearms includes a recording device and a transmitting device, each of the recording and transmitting devices disposed internally to the one or more firearms, and wherein tampering with the recording and transmitting devices disables the one or more firearms;
    wherein the recording device records data related to a discharge of at least one of the one or more firearms in response to the discharge, the data recorded in a memory of the recording device and the data includes a time, a date, a number of the one or more discharges of the one or more firearms, and a location of the firearm at the time of the one or more discharges;
    wherein the transmitting device initiates transmission of information wirelessly from the one or more firearms in response to a discharge from at least one of the firearms to a crime reporting and tracking database on the computer server in real-time via the one or more networks such that the crime reporting and tracking database is updated in response to the discharge, the information including at least one discharge event indicating the discharge;
    wherein the transmitted information establishes relationships between the discharged firearm, committed crimes at the location, and missing persons associated with the location within the crime reporting and tracking database and updates the crime reporting and tracking database with a current whereabouts of a crime suspect at the time of the discharge in real-time;
    wherein the transmitted information comprises identification of a firearm (firearm ID), the date, the time, a location and the number of the one or more discharges of the one or more firearms;
    wherein the crime reporting and tracking database comprises type of crime committed, location of the criminal incident, date and time ranges of the criminal incident, and victim and suspect profile information;
    wherein the victim and suspect information comprises personnel information, known residences and whereabouts of suspects at the approximate time of the crime;
    wherein in the case of a missing person, the locations where the missing person was last seen, and the dates and time ranges when the person was thought to be missing are also included in the database;
    wherein the one or more input and output devices are connected to the computer server via the one or more networks;
    wherein a GUI configured for the one or more input and output devices facilitates the entry of information and queries to the crime reporting and tracking database, the queries comprising:
    receiving a request from a requestor, the request comprising an incident date, an incident time, and a location of interest;
    comparing the incident date, the incident time, and the location of interest to the recorded data;
    collecting the recorded data responsive to determining that the incident date, the incident time and location of interest match the date, time, and a location of the one or more discharges; and
    transmitting the collected data to the requester; and
    wherein the GUI is configured for displaying information outputted from the crime reporting and tracking database on the one or more input and output devices.

12. The system of claim 11, wherein the discharging firearm location is determined by at least one of the following: cellular infrastructure equipment, Internet gateways and their associated Internet protocol (IP) addresses in a wireless local area network (WLAN).

13. The system of claim 11, wherein the discharging firearm location is utilized to construct geographic overlays of the firearm discharges with the committed crimes and missing persons within the crime reporting and tracking database.

* * * * *